May 19, 1925.  
G. G. EARL  
1,538,427  
MEANS AND METHOD FOR GOVERNING FLUID PRESSURES  
Filed Aug. 27, 1918  2 Sheets-Sheet 1

GEORGE G. EARL  
INVENTOR.

BY *J. O. Richey*  
HIS ATTORNEY

Patented May 19, 1925.

1,538,427

UNITED STATES PATENT OFFICE.

GEORGE GOODELL EARL, OF NEW ORLEANS, LOUISIANA.

MEANS AND METHOD FOR GOVERNING FLUID PRESSURES.

Application filed August 27, 1918. Serial No. 251,662.

*To all whom it may concern:*

Be it known that I, GEORGE G. EARL, a citizen of the United States, residing at New Orleans, in the parish of Orleans and State of Louisiana, have invented certain new and useful Improvements in Means and Methods for Governing Fluid Pressures; and I do hereby declare the following to be a full, clear, and exact description of the invention, such as will enable others skilled in the art to which it appertains to make and use the same.

My invention relates to means and methods for governing fluid pressures, and is useful for numerous purposes, such as controlling fluid flows, governing apparatus for indicating and regulating fluid flows, regulating a gas flow in cubic feet or other dimension per unit of time independent of its density, or in pounds of gas, or to maintain a constant pressure measured either from absolute zero of pressure or from atmosphere, and many other uses, too numerous to mention here.

Preventing overreaching and underreaching of controlling mechanisms is one of the principal objects of my invention. It is well known that apparatus now employed for such purposes as automatically controlling fluid flows, automatically stabilizing flying machines and automatically regulating the depths of submarines is subject to overreaching and underreaching, always with deleterious and sometimes with disastrous results.

I have found by actual practice that my invention, which relies for its operation upon well known hydrostatic and hydraulic laws, effectively prevents such overreaching and underreaching, and always insures correct and proper automatic control.

Simplicity, rapidity of action and cheapness of construction are other objects of my invention.

These and other objects, as well as the invention itself, may be better understood from descriptions and illustrations of embodiments of my invention.

Figure 1:
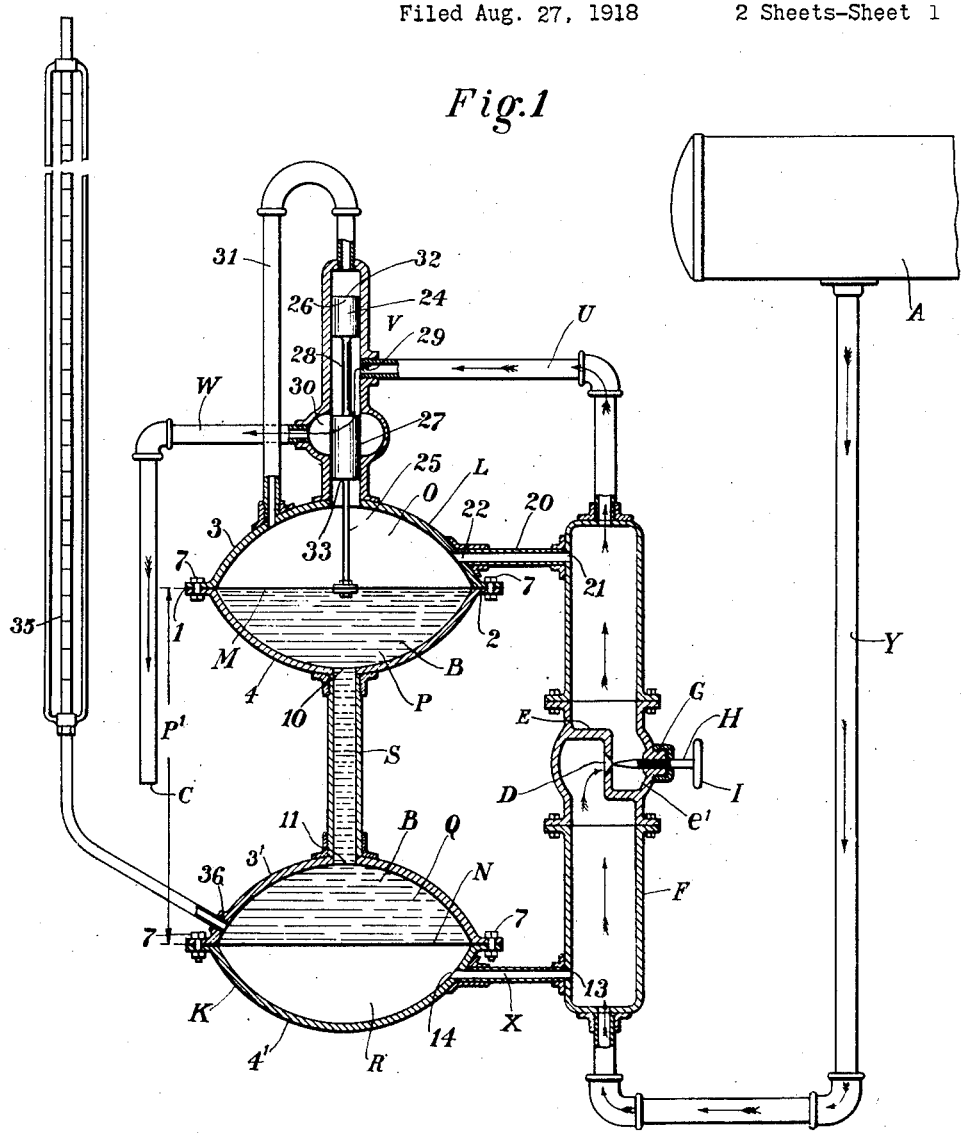
Figure 2:
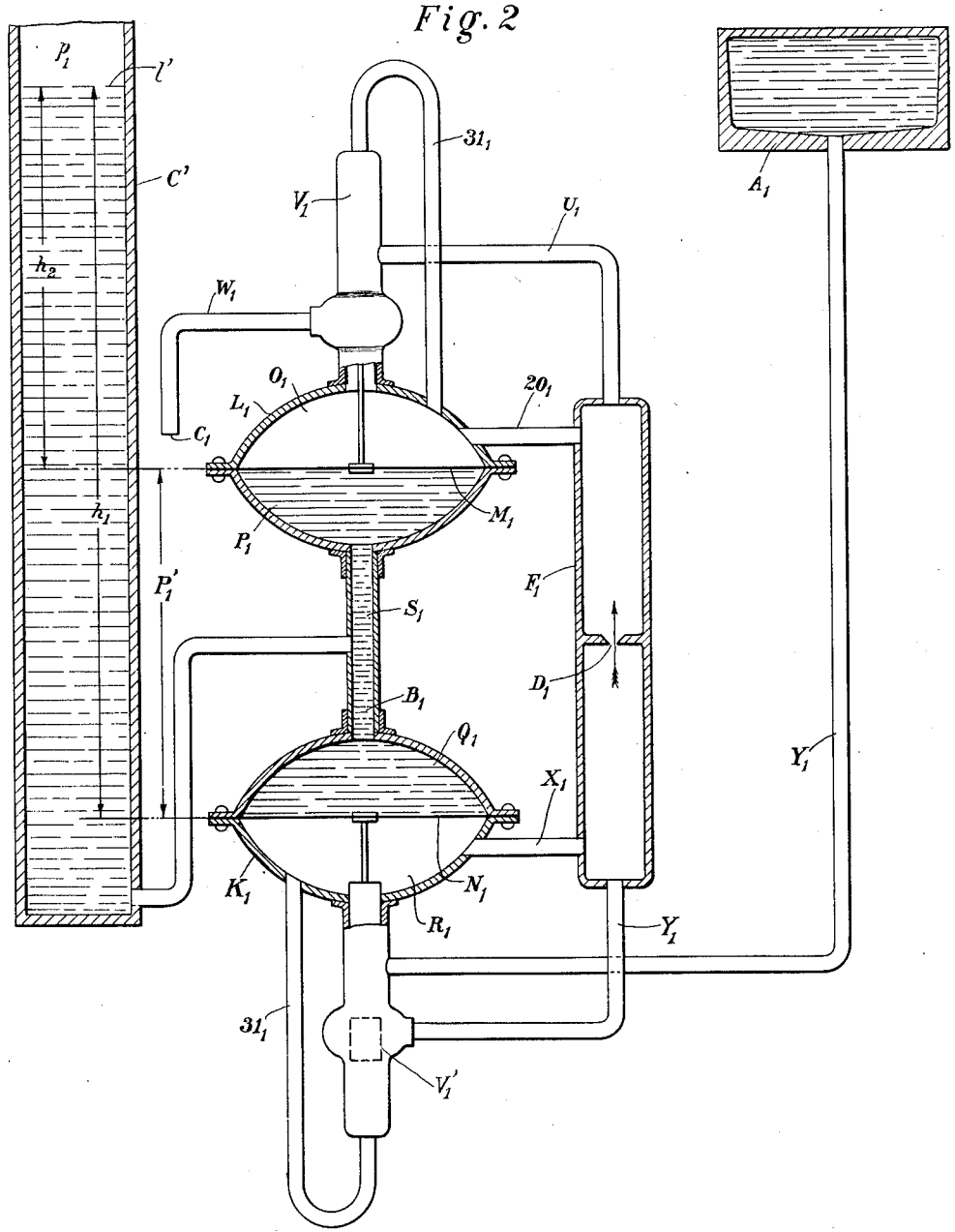

Fig. 1 is a diagrammatic view of one embodiment of my invention; Fig. 2 is a similar view of a second embodiment of my invention.

In the embodiments of my invention illustrated, I apply my invention to systems employing movable surfaces, which may be diaphragms or divisions, and located between two pressures, and which control, through their movements, the operation of fluid or fluid pressure regulating mechanism to maintain equal the pressures applied to such surfaces. In such embodiments I combine with such equal pressure movable surfaces definite amounts of a liquid whose pressure acts on one side thereof, and which liquid is of greater specific gravity than the liquid acting on the other side thereof. The heavier liquid is confined in containers so formed and dimensioned and placed as to permit not only the maintenance of equal pressures on the two sides of such surface, but will result as well in causing predetermined amounts of motion at such dimensions and in a governing valve for predetermined departures from normal pressure conditions, thereby bringing either constant, or slower or more rapid corrective efforts, as may be required. By the use of one or more equal pressure surfaces, which may be divisions or diaphragms operated upon by two or more fluid pressures, due to fluids of different specific gravity, corrective effects are exerted whenever departure from normal exists. I can also regulate the intensity of the desired corrective effect in any desired relation to the amount of departure from the desired normal condition.

In the embodiment shown in Fig. 1 a source of fluid is shown at A and a quantity of fluid is shown at B. The fluid at B is heavier than the fluid in the source A. For example, suppose the fluid in A is air and that in B is water or mercury. The fluid at A is under pressure sufficient to carry it through the system, and through an outlet of relatively low pressure at C. At D is shown an orifice which may be adjustable. In the embodiment shown a web or diaphragm E is placed in a chamber F in the passageway for the fluid from A to C. A part $e'$ controlling the orifice D is movably mounted in a sleeve G. A stem H is threaded in an opening in the sleeve G. A wheel I is mounted upon the end of H, and when the said wheel is rotated, the stem H is threaded up and down in the opening in the sleeve G, moving the member $e'$ back and forth and thus regulating the orifice at D.

At K and L are shown two fluid chambers. A diaphragm or movable division M is mounted in the chamber L, in any suitable manner. In the embodiment shown the edges of the diaphragm are clamped at 1 and 2 between the edges of the sections 3 and 4 of the chamber L. These sections may be of any suitable shape. In the embodiment shown, they are substantially hemispherical. The flanges of the sections 3 and 4 of the chamber are connected together by any suitable means, such as by bolts 7, which clamp together the flanges and the edge of the diaphragm. The chamber is thus divided into two cells O and P. Likewise, a diaphragm N is mounted in the chamber K, dividing it into two cells Q and R.

The cells P and Q are connected by any suitable means, such as a duct S which enters the cell P at a port 10 and the cell Q at a port 11. The heavier liquid B fills the cells P and Q and the duct S. The passageway from A to C includes a duct Y, chamber F, a duct U, a valve chamber V and a duct W. A duct X connects the passageway on the approach side of the orifice D to the cell R, leading from a port 13 in the passageway to a port 14 in the walls of the cell R. A duct 20 connects the passageway on the discharge side of the orifice with the cell O. Preferably, this passage-way leads from a port 21 in the chamber F to a port 22 in the walls of the cell O.

The diaphragm M is connected to a valve 24, for example, by a stem 25, so that the valve 24 is controlled by the diaphragm. In fact, in the embodiment shown, it is operated directly by the diaphragm through the stem 25. The valve 24 is composed of end portions 26 and 27 of the same area as the valve chamber V, thereby effectively preventing the passage of fluid in such chamber beyond the ends of the valve. The parts 26 and 27 are connected by a central stem 28, thus forming a spool-shaped valve.

Fluid from the duct U enters the valve chamber at a port 29, flowing around the stem 28 and through the port 30, if the same is open or partly open, to waste at C. The port 30 is controlled by the valve 24 and will be opened, closed, or partly opened and partly closed, according to the position of the diaphragm M. A duct 31 is employed to convey the pressure of the fluid in cell O to the end 32 of the valve, so that the pressure at 32 will balance the pressure at 33.

A sight tube is shown at 35, connected through a port 36 to the cell Q. I have shown the sight tube as a convenient means for indicating the pressure under the diaphragm M. It will be apparent that any suitable pressure indicating means may be employed.

The pressure of the fluid on the approach side of the orifice D is transmitted through the duct X to the under side of the diaphragm N. The valve 24, operated by the diaphragm M, governs the escape of fluid to maintain a pressure over the diaphragm M as much less than the pressure in R as the pressure due to the liquid column P'. The flow through restriction D, therefore, is due to a constant difference of pressure P', and if the flow is gas through variations of pressure at the source A it will remain constant in volume, but will vary in weight per unit in volume, depending upon the pressure measured from absolute zero pressure. Since it is desired to maintain the same pressure difference for all positions of the valve 24, the two diaphragms are disposed in this particular embodiment of the invention one above the other, and are preferably made of the same areas.

The fluid, of course, flows from the source A, exerting pressure through X to the under side of the diaphragm N and through the orifice D, where its pressure is cut down, into the duct U and through the valve chamber. The pressure on the discharge side of the orifice is exerted on the upper side of the diaphragm M. The diaphragm will, of course, move until the valve is so positioned as to maintain a difference in pressure on the two sides of the orifice equal to the liquid column P'. If the pressure on the approach side of the orifice increases or decreases, the diaphragms M and N and the liquid columns will be caused to fluctuate to control the valve 24 to compensate for such change in pressure.

In the embodiment shown in Fig. 2, not only is the flow maintained constant, but the density of the flow is maintained constant. In general, this is accomplished by maintaining constant pressures, as well as a constant pressure difference, upon the opposite sides of the two diaphragms.

At $A_1$ is shown a source of fluid pressure and supply, such as a conduit, conveying water or air, conducted through a duct $Y_1$ to a valve chamber $V_1'$ controlled by a valve similar to valve 24. A duct $y_1$ leads to a container $F_1$ in which there is an orifice $D_1$. A duct $X_1$ connects the approach side of the orifice with the cell $R_1$ of a chamber $K_1$, and conveys the pressure on the approach side of the orifice to the under side of the diaphragm $N_1$ in such chamber. The valve $V_1'$ is controlled by the diaphragm $N_1$, as will be understood from a description of a similar part of the apparatus shown in Fig. 1.

The discharge side of the orifice is connected by a duct $20_1$ with the sell $O_1$ of the chamber $L_1$ and conveys the pressure on the discharge side of the orifice to the upper side of the diaphragm $M_1$ therein. The duct $U_1$ connects the discharge side of the orifice with the valve chamber $V_1$, in which there is housed a valve similar to valve 24. Such valve is controlled by the diaphragm $M_1$ in a manner which will be understood from a description of similar parts in Fig. 1.

A duct $W_1$ leads from the valve chamber to a low pressure outlet $C_1$. The spaces in the cells $P_1$, $Q_1$ and $S_1$ are filled with a heavier fluid, such as water or mercury, and this space is connected to a container $C'$ of relatively large area filled to any level $l_1$ with any pressure $p_1$ working over it. For simplicity, we may assume that the pressure $p_1$ is atmospheric pressure.

The pressure on the top of the diaphragm $N_1$ will be $h_1+p_1$ and the pressure on the bottom of the diaphragm $M_1$ will be $h_2+p_1$. No matter what the values of the pressures $h_1$, $h_2$ and $p_1$, the difference in the pressures exerted on the upper side of $N_1$ and the bottom side of $M_1$ will be $P_1'$. As in Fig. 1, the pressure difference on the two sides of the orifice $D_1$ will always be equal to $P_1'$. The pressures on the two sides of the diaphragms $M_1$ and $N_1$ will be maintained equal, so that the pressure on the approach side of the orifice $D_1$ will be equal to $h_1+p_1$ and the pressure on the discharge side thereof will be maintained equal to $h_2+p_1$, with the result, as will readily be seen, that not only the pressure differences but the actual pressures will be maintained constant, so that the density of the fluid, as well as the volume thereof, which flows through the orifice, will be maintained constant. It is obvious, therefore, that by varying the liquid level $l$ or the pressure $p_1$, the pressure on the two sides of the orifice $D_1$ can be varied, while the difference between said pressures remains constant. Thus, for incompressible liquids we have a constant output in pounds under a varying pressure, depending upon pressure $h_1+p_1$, and for compressible gases we have a means of governing the weight of gas passed through the orifices $D_1$ under a constant difference of pressure by changing the pressure under which it is measured through changing $h_1$ or $p_1$.

While I have shown these particular embodiments of my invention and the particular details thereof, it will be apparent to those skilled in the art that numerous departures may be made therefrom without departing from the spirit of the invention.

I claim:—

1. In a fluid system, the combination of a container containing a definite amount of fluid of a certain specific gravity, means containing a fluid of a different specific gravity than the fluid in said container, a valve controlling the pressure of fluid in said means, a movable fluid-tight division governing said valve, and means to cause the pressure of the fluids to act on said division and react against each other thereat.

2. In a fluid system, the combination of a container containing a definite amount of fluid of a certain specific gravity, means containing a fluid of a different specific gravity than the fluid in said container, a valve controlling the pressure of fluid in said means, a movable fluid-tight division governing said valve, and means to cause the pressures of the fluids to act on said division and react against each other thereat, said container and first named means having predetermined forms, dimensions and positions with respect to each other.

3. In a fluid system, the combination of a container containing a definite amount of fluid of a certain specific gravity, means containing a fluid of a different specific gravity than the fluid in said container, a valve controlling the pressure of fluid in said means, a movable fluid-tight division governing said valve, and means to cause the pressure of the fluids to act on said division and react against each other thereat, one of said fluids being a liquid.

4. In a fluid system, the combination of a container containing a definite amount of fluid of a certain specific gravity, means containing a fluid of a different specific gravity than the fluid in said container, a valve controlling the pressure of fluid in said means, a movable fluid-tight division governing said valve, and means to cause the pressures of the fluids to act on said division and react against each other thereat, said container and first named means having predetermined forms, dimensions and positions with respect to each other, and said fluids being liquids.

5. In a fluid system, the combination of a container containing a definite amount of fluid of a certain specific gravity, means containing a fluid of a different specific gravity than the fluid in said container, a valve controlling the pressure of fluid in said means, a movable fluid-tight division adapted to assume a plurality of positions governing said valve and means to cause the pressures of the fluids to act on said division and react against each other thereat and thereby maintain a condition of equilibrium for said movable fluid-tight division in all its positions.

6. In a fluid system, the combination of a container containing a definite amount of fluid of a certain specific gravity, means containing a fluid of a different specific gravity than the fluid in said container, a valve controlling the pressure of fluid in said means, a movable fluid-tight division governing said valve, and means to cause the pressure of the fluids to act on said division and react against each other thereat, said container and first named means having predetermined forms, dimensions and positions with respect to each other.

7. In a fluid system, the combination of a container containing a definite amount of fluid of a certain specific gravity, means containing a fluid of a different specific gravity than the fluid in said container, a valve controlling the pressure of fluid in said means, a movable fluid-tight division adapted to assume a plurality of positions governing said valve and means to cause the pressures of the fluids to act on said division and react against each other thereat and thereby maintain a condition of equilibrium for said movable fluid-tight division in all its positions, one of said fluids being a liquid.

8. In a fluid system, the combination of a container containing a difinite amount of fluid of a certain specific gravity, means containing a fluid of a different specific gravity than the fluid in said container, a valve controlling the pressure of fluid in said means, a movable fluid-tight division governing said valve, and means to cause the pressure of the fluids to act on said division and react against each other thereat, said container and first named means having predetermined forms, dimensions and positions with respect to each other.

9. In a fluid distributing system, a source of fluid supply, a duct, said duct being divided into supply and exhaust portions by an intermediate portion of relatively high resistance to fluid flow, a valve in the said exhaust portion, an exhaust opening, said valve being located intermediate the said opening and the said intermediate portion, a pair of pressure chambers, one communicating with the said duct supply portion, the other with the said duct exhaust portion, a movable wall for each chamber, a third chamber intermediate the said movable walls, a fluid filling the said third chamber, and said valve being adapted to be operated under the control of the movable wall of the second chamber, and said wall being responsive to the difference of pressure in the pair of chambers.

10. In a fluid distributing system, a source of fluid supply, a duct, said duct being divided into supply and exhaust portions by an intermediate portion of relatively high resistance to fluid flow, a valve in the said exhaust portion, an exhaust opening, said valve being located intermediate the said opening and the said intermediate portion, a pair of pressure chambers, one communicating with the said duct supply portion, the other with the said duct exhaust portion, a movable wall for each chamber, a third chamber intermediate the said movable walls, a fluid filling the said third chamber, and the second chamber movable wall being adapted to control the said valve to variably limit the escape of fluid from the said exhaust opening.

11. In a fluid distributing system, a source of fluid supply, a duct, said duct being divided into supply and exhaust portions by an intermediate portion of relatively high resistance to fluid flow, a valve in the said exhaust portion, an exhaust opening, said valve being located intermediate the said opening and the said intermediate portion, a pair of resilient elements responsive to fluid pressure, one associated with the exhaust portion and the other associated with the supply portion of the said duct, each adapted to be variably moved in response to the varying pressures of the said portions, a trapped fluid between the said movable elements.

12. In a fluid distributing system, a source of fluid supply, a duct, said duct being divided into supply and exhaust portions by an intermediate portion of relatively high resistance to fluid flow, a pair of resilient elements responsive to fluid pressure, one associated with the exhaust portion and the other associated with the supply portion of the said duct, each adapted to be variably moved in response to the varying pressures of the said portions, a trapped fluid between the said movable elements, and a valve variably controlling the flow of fluid through the said exhaust opening, said movable elements controlling said valve.

13. In a fluid distributing system, a source of fluid supply, a duct, said duct being divided into supply and exhaust portions by an intermediate portion of relatively high resistance to fluid flow, a pair of resilient elements responsive to fluid pressure, one associated with the exhaust portion, and the other associated with the supply portion of the said duct, each adapted to be variably moved in response to the varying pressures of the said portions a trapped fluid between the said movable elements, and a valve variably controlling the flow of fluid through the said exhaust opening, said movable elements controlling said valve, and the specific gravity of the trapped fluid being different from that of the fluid from the said source.

14. In a fluid distributing system, a source of fluid supply, a duct, said duct being divided into supply and exhaust portions by an intermediate portion of relatively high resistance to fluid flow, a pair of resilient elements responsive to fluid pressure, one associated with the exhaust portion and the other associated with the supply portion of the said duct, each adapted to be variably moved in response to the varying pressures of the said portions, a trapped fluid between the said movable elements, and a valve variably controlling the flow of fluid through the said exhaust opening, said movable elements controlling said valve, and the trapped fluid being of higher specific gravity than the flowing fluid.

15. In a fluid distributing system, a source of fluid supply, a duct, said duct being divided into supply and exhaust portions by an intermediate portion of relatively high resistance to fluid flow, a pair of resilient elements responsive to fluid pressure, one associated with the exhaust portion, and the other associated with the supply portion of the said duct, each adapted to be moved in response to the varying pressures of the said portions, a trapped fluid between the said movable elements, and a valve variably controlling the flow of fluid through the said exhaust opening, said movable elements controlling said valve, the trapped fluid being of higher specific gravity than the flowing fluid, and one of the said resilient elements being located above the other, the weight of the trapped fluid being exerted on the lower element alone.

16. The method of maintaining a constant flow through a conduit at a constant rate, comprising, balancing a pair of opposing fluid pressures taken at points of differing fluid pressure in the conduit and opposing fluid pressure by a pre-determined third pressure and utilizing the result of the three pressures to variably restrict the flow through the conduit.

17. The method of maintaining a constant flow at constant density through a conduit comprising balancing a pair of opposing fluid pressures taken at points of differing fluid pressure in the conduit and opposing the higher pressure by a pre-determined third pressure and utilizing the result of the three pressures to variably restrict the flow through the conduit, such variable restriction being accomplished in the exhaust end of the conduit, and in moreover restricting the flow at the supply end of the conduit according to the sum of the lower pressure of the pair of pressures and the said third pressure less the higher pressure.

18. In a fluid system, a source of fluid supply, a conduit leading from the said source, a valve in the said conduit adapted to restrict the flow therethrough, means for operating the said valve comprising a pair of pressure cells, a duct for each cell adapted to communicate pressure thereto, each from a point of different pressure in the said conduit when fluid is flowing therethrough, said valve in its different operative positions adapted to control the difference in pressure communicated to the said cells by the said ducts, a member responsive to the difference in pressures in the said cells adapted to move the said valve, pressure communicating means associated with said cells and comprising a quantity of liquid separate from the fluid passing through the said conduit, pressure from the said conduit being adapted to support a column.

19. In a fluid system, a source of fluid supply, a conduit leading from the said source, a valve in the said conduit adapted to restrict the flow therethrough, means for operating the said valve comprising a pair of pressure cells, a duct for each cell adapted to communicate pressure thereto, each from a point of different pressure in the said conduit when fluid is flowing therethrough, said valve in its different operative positions adapted to control the difference in pressure communicated to the said cells by the said ducts, a member responsive to a predetermined difference in pressures in the said cells adapted to move the said valve, pressure communicating means comprising a quantity of liquid of a different specific gravity than the fluid passing through the said conduit, pressures from the said cells acting oppositely on the said member, said valve being operative to maintain equality of pressures operative on the said member.

20. In a fluid system, the combination with a source of fluid under high pressure, an outlet for fluid from the said source, a conduit leading from the source to the outlet, a plurality of fluid flow regulating mechanisms, each of said mechanisms comprising a valve, each of said valves being serially interposed in the conduit to control the flow therethrough, a valve controlling mechanism for each valve including a valve motor comprising a movable wall and a pair of fluid containing chambers on either side of said wall, one of each pair of chambers for each valve motor communicating with a regulating fluid exerting a predetermined fluid pressure, the other chamber of each pair of chambers for each motor communicating with the flowing fluid from the source of high pressure fluid at points of different fluid pressure therein, to direct pressure to oppose the pressure exerted by said regulating fluid against said wall, each said wall being yieldingly and oppositely responsive to the opposing pressures in the two chambers, means to transmit movements of each said wall to its associate valve.

21. In a fluid system, a source of fluid under pressure, a conduit leading from the said source to conduct fluid therefrom, a pair of fluid flow controlling valves in the conduit, a movable means for each valve controlling by its motion the movement of its associated valve, a first of said valves being disposed in the conduit nearer to the said source than the other valve, a duct for communicating fluid pressure from the conduit to the said movable means for the said first valve from a point in the conduit on the discharge side of said first valve, a second duct to communicate a pressure from the said movable means for the said other valve from a different point in the said conduit, such different point being nearer than the first mentioned point to the approach side of said other valve, and pressure means operating on both of said movable means to exert a pressure thereagainst in opposition to the communicated pressures from the said conduit, the effort of pressure so exerted against the said movable means for the first valve being greater than the pressure so exerted against the said movable means for the said other valve, and a section of the said conduit disposed between the said ducts offering a resistance to the fluid flowing therethrough, each of said valves being responsive to variably restrict the flow of fluid through the conduit.

22. In a fluid system, a source of fluid under pressure, a conduit leading from the said source to conduct fluid therefrom, a pair of fluid flow controlling valves in the conduit, a movable means for each valve controlling by its motion the movement of its associated valve, a first of said valves being disposed in the conduit nearer to the said source than the other valve, a duct for communicating fluid pressure from the conduit to the said movable means for the said first valve from a point in the conduit on the discharge side of said first valve, a second duct to communicate a pressure from the said movable means for the said other valve from a different point in the said conduit, such different point being nearer than the first mentioned point to the approach side of said other valve, and pressure means operating on both of said movable means to exert a pressure thereagainst in opposition to the communicated pressures from the said conduit, the effort of pressure so exerted against the said movable means for the first valve being greater than the pressure so exerted against the said movable means for the said other valve, and a section of the said conduit disposed between the said ducts offering a resistance to the fluid flowing therethrough, each of said valves being responsive to variably restrict the flow of fluid through the conduit, said first valve movable towards closed position and said second valve movable towards open position upon increases of fluid pressure in the said conduit section.

23. In a fluid distributing system, a source of fluid supply, a duct, said duct being divided into supply and exhaust portions by an intermediate portion of relatively high resistance to fluid flow, a valve in the said exhaust portion, an exhaust opening, said valve being located intermediate the said opening and the said intermediate portion, a pair of pressure chambers, one communicating with the said duct supply portion, the other with the said duct exhaust portion, a movable wall for each chamber, a third chamber intermediate the said movable walls, a liquid filling the said third chamber, and said valve being adapted to be operated under the control of the movable wall of the second chamber, said wall being responsive to the difference of pressure in the pair of chambers, and a reservoir communicating liquid to the chamber between the said movable wall elements under pressure to maintain such chamber completely full of liquid at all times.

24. In a fluid distributing system, a source of fluid supply, a duct, said duct being divided into supply and exhaust portions by an intermediate portion of relatively high resistance to fluid flow, a valve in the said exhaust portion, an exhaust opening, said valve being located intermediate the said opening and the said intermediate portion, a pair of pressure chambers, one communicating with the said duct supply portion, the other with the said duct exhaust portion, a movable wall for each chamber, a third chamber intermediate the said movable walls, a liquid filling the said third chamber, the second chamber movable wall being adapted to control the said valve to variably limit the escape of fluid from the said exhaust opening, and a reservoir communicating liquid to the chamber between the said movable wall elements under pressure to maintain such chamber completely full of liquid at all times.

25. In a fluid distributing system, a source of fluid supply, a duct, said duct being divided into supply and exhaust portions by an intermediate portion of relatively high resistance to fluid flow, a valve in the said exhaust portion, an exhaust opening, said valve being located intermediate the said opening and the said intermediate portion, a pair of resilient elements responsive to fluid pressure, one associated with the exhaust portion and the other associated with the supply portion of the said duct, each adapted to be variably moved in response to the varying pressures of the said portions, a trapped liquid between the said movable elements, and a reservoir communicating liquid to the chamber between the said movable wall elements under pressure to maintain such chamber completely full of liquid at all times.

In witness whereof, I have hereunto signed my name this 3rd day of August, 1918.

GEORGE GOODELL EARL.